United States Patent
Gui et al.

(10) Patent No.: US 10,474,273 B2
(45) Date of Patent: Nov. 12, 2019

(54) METHOD AND APPARATUS FOR DETECTING A FORCE

(71) Applicant: SHENZHEN GOODIX TECHNOLOGY CO., LTD., Shenzhen (CN)

(72) Inventors: Xintao Gui, Shenzhen (CN); Xiaoxiang Chen, Shenzhen (CN); Xiang Zhong, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 110 days.

(21) Appl. No.: 15/694,797

(22) Filed: Sep. 3, 2017

(65) Prior Publication Data

US 2018/0011583 A1   Jan. 11, 2018

Related U.S. Application Data

(63) Continuation of application No. PCT/CN2016/084029, filed on May 31, 2016.

(51) Int. Cl.
  *G06F 3/041*   (2006.01)
  *G06F 3/044*   (2006.01)

(52) U.S. Cl.
  CPC ............ *G06F 3/0414* (2013.01); *G06F 3/044* (2013.01)

(58) Field of Classification Search
  CPC ..... G06F 3/044; G06F 3/0414; G01L 27/005; G01L 9/0072
  See application file for complete search history.

(56) References Cited

U.S. PATENT DOCUMENTS

| 7,158,122 B2 | 1/2007 | Roberts |
| 9,069,460 B2 | 6/2015 | Moore |

(Continued)

FOREIGN PATENT DOCUMENTS

| CN | 103425331 A | 12/2013 |
| CN | 103827785 A | 5/2014 |

(Continued)

OTHER PUBLICATIONS

Kim, NPL article, force sensing model of capacitive hybrid touch sensor using thin-film force sensor and its evaluation, International Journal of Precision Engineering and Manufacturing, vol. 16, No. 5, pp. 981-988, May 2015 (Year: 2015).*

(Continued)

*Primary Examiner* — Yuzhen Shen

(57) ABSTRACT

The present disclosure provide a method for detecting a force, including: acquiring a plurality of sample data of a first electronic device, where each of the plurality of sample data includes a preset force and raw data of the first electronic device, and the raw data of the first electronic device is obtained by detecting a deformation signal generated by the preset force applied to an input medium of the first electronic device; and determining a fitting function according to the plurality of sample data of the first electronic device, where the fitting function denotes a corresponding relationship between a force applied to the input medium of the first electronic device and detected raw data, and the fitting function is used for a second electronic device to determine a force corresponding to raw data detected when an input medium of the second electronic device is subjected to an acting force.

10 Claims, 8 Drawing Sheets

(56) References Cited

U.S. PATENT DOCUMENTS

| | | | |
|---|---|---|---|
| 9,476,790 B2* | 10/2016 | Kajikawa | G01L 27/005 |
| 2003/0214485 A1 | 11/2003 | Roberts | |
| 2007/0052690 A1 | 3/2007 | Roberts | |
| 2013/0063389 A1 | 3/2013 | Moore | |
| 2013/0307799 A1 | 11/2013 | Hauf | |
| 2014/0062934 A1 | 3/2014 | Coulson et al. | |
| 2014/0104197 A1 | 4/2014 | Khosravy et al. | |
| 2016/0320914 A1* | 11/2016 | Tachikawa | G01L 1/205 |
| 2016/0328067 A1* | 11/2016 | Aoki | G06F 3/0416 |
| 2017/0177114 A1* | 6/2017 | Frey | G01L 1/146 |

FOREIGN PATENT DOCUMENTS

| | | |
|---|---|---|
| CN | 104615326 A | 5/2015 |
| CN | 104834380 A | 8/2015 |
| JP | 2014052804 A | 3/2014 |
| JP | 2015222603 A | 12/2015 |
| KR | 20140097181 A | 8/2014 |

OTHER PUBLICATIONS

Adafriut Industries Notes, First Published on line on May 15, 2015, (Year: 2015).*

International Search Report for International Application No. PCT/CN2016/084029, Applicant: Shenzhen Goodix Technology Co., Ltd., Mar. 6, 2017, 5 pages.

* cited by examiner

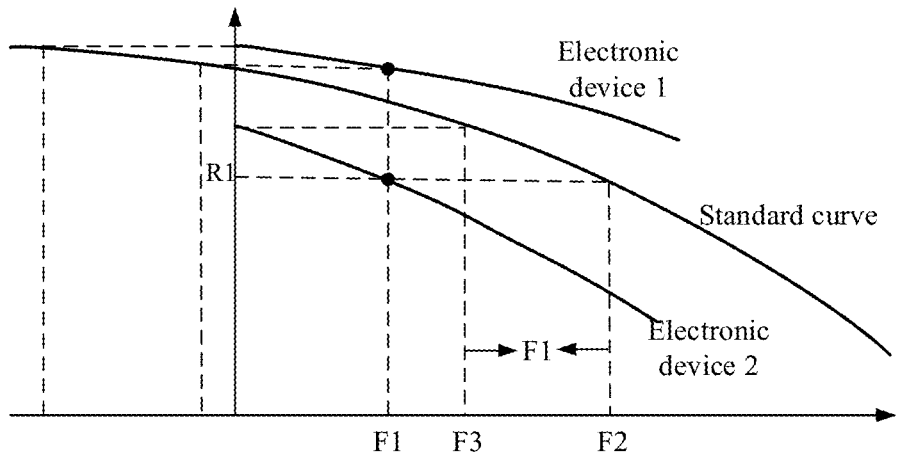

FIG. 10

| 510, acquiring a plurality of sample data of a first electronic device |

| 520, determining, according to the sample data of the first electronic device, a force offset of the j-numbered sample data of a third electronic device |

| 530, updating the sample data of the third electronic device according to the force offset |

| 540, determining the fitting function according to the plurality of sample data of the first electronic device and the plurality of updated sample data of the third electronic device |

| 550, determining, by the second electronic device, a difference between a first force obtained by substituting first rawdata into the fitting function and a second force obtained by substituting second rawdata into the fitting function as a force corresponding to the first rawdata detected when an input medium of the second electronic device is subjected to the acting force |

FIG. 11

METHOD AND APPARATUS FOR DETECTING A FORCE

CROSS REFERENCE TO RELATED APPLICATIONS

The present application is a continuation of international application No. PCT/CN2016/084029 filed on May 31, 2016, which is hereby incorporated by reference in its entirety.

TECHNICAL FIELD

The present disclosure relates to the field of terminal devices, and in particular, to a method and an apparatus for detecting a force.

BACKGROUND

Mobile electronic devices have brought lots of convenience for people's daily life and work, and have become an indispensable tool for people. There are multiple types of input apparatuses for mobile electronic devices, such as a keypad, a mouse, a joystick, a laser pen and a touch screen. Touch technology is rapidly applied to various electronic devices due to its good interactivity, the technology already tends to be mature, and various possible applications based on the technology have also been fully exploited.

With the development of technology, a user also has an increasing demand for the operating experience of an electronic device such as a mobile phone and tablet, and looks forward to a more convenient human-computer interactive experience. Based on positional information provided by the touch technology, force ("Force", "F" for short) detection technology adds another dimensional information. Various applications may be developed on the basis of input force information, which will bring a brand-new operating experience for people using the electronic devices, for instance, effects such as popping up a drop-down menu or a "small ball" by pressing a screen, accelerating the speed of scrolling a page up and down, left and right by a heavy load, and a touch feedback may be provided.

At present, the force detection technology are mainly include an inductive type, a resistive type, a capacitive type, a piezoelectric type, a micro-electromechanical system and the like. Since a portable electronic device is limited by space and structure of mainboards, a portable electronic device mainly adopt two types of force sensor, namely, an array strain gauge and an array capacitor, to detect a force. Since a capacitive sensing array is adopted by touch detection technology applied to most of portable electronic devices at present, the force detection technology adopts an array capacitor to detect a force has a greater advantage.

Unlike touch detection, force detection not only needs to detect whether there is a force or not, but also the magnitude of the force, i.e., a precise force measurement. However, the force cannot be accurately calculated by an electronic device in the prior art based on detected raw data ("Raw data", "R" for short).

SUMMARY

Embodiments of the present disclosure provide a method and an apparatus for detecting a force, so that a function relationship between a force applied to an electronic device and detected raw data may be determined according to the plurality of acquired sample data.

In a first aspect, a method for detecting a force is provided. The method includes: acquiring a plurality of sample data of a first electronic device, where each of the plurality of sample data of the first electronic device includes a preset force of the first electronic device and raw data of the first electronic device, and the raw data of the first electronic device is obtained by detecting a deformation signal generated by the preset force of the first electronic device applied to an input medium of the first electronic device; and determining a fitting function according to the plurality of sample data of the first electronic device, where the fitting function denotes a corresponding relationship between a force applied to the input medium of the first electronic device and detected raw data, and the fitting function is used for a second electronic device to determine a force corresponding to raw data detected when an input medium of the second electronic device is subjected to an acting force.

By acquiring a plurality of sample data of a first electronic device, where each sample data includes a preset force and raw data, and the raw data is raw data obtained by detecting the preset force of the first electronic device, and determining, according to the plurality of sample data, a fitting function denoting a corresponding relationship between a force applied to the first electronic device and detected raw data, where the fitting function is used for a second electronic device to determine a force corresponding to raw data detected when it is subjected to an acting force, a function relationship between a force applied to an electronic device and detected raw data may be determined according to a plurality of acquired sample data, thus promoting various applications based on force information and improving user experience.

With reference to the first aspect, in a first possible embodiment of the first aspect, the method further includes: acquiring a plurality of sample data of a third electronic device, where each of the plurality of sample data of the third electronic device includes a preset force of the third electronic device and raw data of the third electronic device, and the raw data of the third electronic device is obtained by detecting a deformation signal generated by the preset force of the third electronic device applied to an input medium of the third electronic device; and updating the plurality of sample data of the third electronic device according to the plurality of sample data of the first electronic device; where the determining the fitting function according to the plurality of sample data of the first electronic device, includes: determining the fitting function according to the plurality of sample data of the first electronic device and the plurality of updated sample data of the third electronic device.

In practical batch production, it is difficult to ensure that an initial distance $d_0$ of sensing electrodes is the same in different electronic devices. Therefore, in an embodiment of the present disclosure, by selecting several electronic devices from batch-produced electronic devices, performing a deviation calculation on sample data of each of the selected electronic devices to update the sample data, and performing a curve fitting according to the updated sample data of the selected electronic device to determine a fitting function, a force corresponding to detected raw data is determined according to the fitting function, so that a more accurate fitting function may be obtained without performing a press operation on each of batch-produced electronic devices, the force corresponding to raw data may be more accurately calculated according to the function, an impact of assembly tolerance may be avoided, and configuration efficiency will be improved.

With reference to the first possible embodiment of the first aspect, in a second possible embodiment of the first aspect, the updating the plurality of sample data of the third electronic device according to the plurality of sample data of the first electronic device, includes: determining a force offset $$\Delta_{2j} = F_{2j} - \left[ F_{1m} + \frac{R_{1m} - R_{2j}}{R_{1m} - R_{1(m+1)}} (F_{1(m+1)} - F_{1m}) \right]$$

of sample data $(F_{2j}, R_{2j})$ of the third electronic device according to $(F_{1m}, R_{1m})$ and $(F_{1(m+1)}, R_{1(m+1)})$, where $F_{1m}$ denotes a preset force applied to the first electronic device, $R_{1m}$ denotes raw data corresponding to the preset force of the first electronic device, and $R_{1m} > R_{1(m+1)}$, m=0, 1, 2, ... $N_1-2$, $N_1$ denotes the number of the sample data of the first electronic device, and $F_{2j}$ denotes a preset force applied to the third electronic device, $R_{2j}$ denotes raw data corresponding to the preset force of the third electronic device, j=0, 1, 2, ... $N_2-1$, $N_2$ denotes the number of the sample data of the third electronic device, and $R_{1m} > R_{2j} > R_{1(m+1)}$; and updating the $(F_{2j}, R_{2j})$ as $(F_{2j} - \Delta_{2j}, R_{2j})$ according to the force offset.

Due to the existence of an error in a measurement, the force offset may be determined by a method of averaging, for instance, updating sample data $(F_{20}, R_{20})$, $(F_{21}, R_{21})$, ..., $(F_{2j}, R_{2j})$, ..., $(F_{2n}, R_{2n})$ of the third electronic device as $(F_{20}-\overline{\Delta}_2, R_{20})$, $(F_{21}-\overline{\Delta}_2, R_{21})$ $(F_{2j}-\overline{\Delta}_2, R_{2j})$, $(F_{2n}-\overline{\Delta}_2, R_{2n})$, where an average force offset of j sample data of the third electronic device is $$\overline{\Delta}_2 = \frac{\sum_j \Delta_{2j}}{n+1}.$$

With reference to the first aspect, and any one of the first possible embodiment of the first aspect and the second possible embodiment of the first aspect, in a third possible embodiment of the first aspect, the force corresponding to first raw data detected when the input medium of the second electronic device is subjected to the acting force is determined by a difference between a first force and a second force, where the first force is obtained by substituting the first raw data into the fitting function, the second force is obtained by substituting second raw data into the fitting function, and the second raw data is obtained by detecting a deformation signal generated by a zero force applied to the input medium of the second electronic device.

After detecting the first raw data, the second electronic device may calculate a first force corresponding to the detected first raw data according to a determined fitting function, then determine second raw data detected when a force is zero, calculate a second force by substituting the second raw data into the fitting function, and determine a difference between the first force and the second force as the magnitude of the force applied to an input medium of the second electronic device. In this way, the second electronic device may accurately calculate a press strength corresponding to the detected raw data according to the fitting function fitted by an electronic device without performing a curve fitting separately, and the force corresponding to the detected raw data may still be accurately calculated, thus improving the efficiency.

With reference to the first aspect, and any one of the first possible embodiment of the first aspect to the third possible embodiment of the first aspect, in a fourth possible embodiment of the first aspect, the force corresponding to the first raw data detected when the input medium of the second electronic device is subjected to the acting force is determined by fourth raw data, a fourth force corresponding to the fourth raw data, fifth raw data and a fifth force corresponding to the fifth raw data, where the fourth raw data is raw data greater than the first raw data in a data corresponding relationship table, and the fifth raw data is raw data smaller than the first raw data in the data corresponding relationship table, and the data corresponding relationship table includes a corresponding relationship between different raw data and forces calculated in advance according to the fitting function.

As it involves a square operation and a root operation in calculating formulas, there is a relatively large amount of calculation for a microprocessor. Therefore, a calculation may be carried out in advance to establish a table, force information may be acquired by looking up the table in use, and then a force corresponding to arbitrary raw data may be calculated by adopting a piecewise linear approximation method.

With reference to the first aspect, and any one of the first possible embodiment of the first aspect to the fourth possible embodiment of the first aspect, in a fifth possible embodiment of the first aspect, the fitting function is:

$$R = \frac{a}{\sqrt{1 + \left(b + \frac{c}{d-F}\right)^2}},$$

where a, b, c and d are known parameters, and a=AG, $b=R_0C_1$, $c=\omega R_0 C_{20} k d_0$ and $d=kd_0$, A denotes an amplitude, G denotes an amplifying circuit gain, $C_1$ and $C_{20}$ denote parallel plate capacitances, $d_0$ denotes an initial spacing of $C_{20}$, k denotes an elastic stiffness coefficient, and $R_0$ denotes a resistance.

In a second aspect, an apparatus for detecting a force is provided. The apparatus includes each module for executing the method of the first aspect or any possible embodiment of the first aspect.

In a third aspect, an apparatus for detecting a force is provided, including a processor and a memory;

the memory stores a program, and the processor executes the program, for executing the method for detecting the force of the above first aspect or any possible embodiment of the first aspect.

Based on the above technical solution, in the embodiments of the present disclosure, by acquiring a plurality of sample data including a preset force and raw data obtained by detecting the preset force of a first electronic device, and determining, according to the plurality of sample data, a fitting function denoting a corresponding relationship between a force applied to the first device and detected raw data, where the fitting function is used for a second device to determine a force corresponding to raw data detected when it is subjected to an acting force, a function relationship between a force applied to an electronic device and detected raw data may be determined according to a plurality of acquired sample data, thus promoting various applications based on force information and improving the user experience.

BRIEF DESCRIPTION OF DRAWINGS

In order to illustrate the technical solution in the embodiments of the present disclosure more clearly, brief description will be made below to the drawings required in the embodiments or the prior art, and apparently, the drawings described below are some embodiments of the present disclosure only, and other drawings could be obtained based on these drawings by those of ordinary skill in the art without creative efforts.

FIG. 10 is a schematic diagram of a method for calculating a force of an embodiment of the present disclosure;

FIG. 11 is a schematic flow diagram of a method for detecting a force of another embodiment of the present disclosure;

DESCRIPTION OF EMBODIMENTS

The technical solution in the embodiments of the present disclosure will be described clearly and fully below in conjunction with the drawings in the embodiments of the present disclosure, and apparently, the embodiments described are only part of embodiments of the present disclosure, not all of them. All of the other embodiments, obtained by those of ordinary skill in the art based on the embodiments of the present disclosure without any creative effort, fall into the protection scope of the present disclosure.

Figure 1:
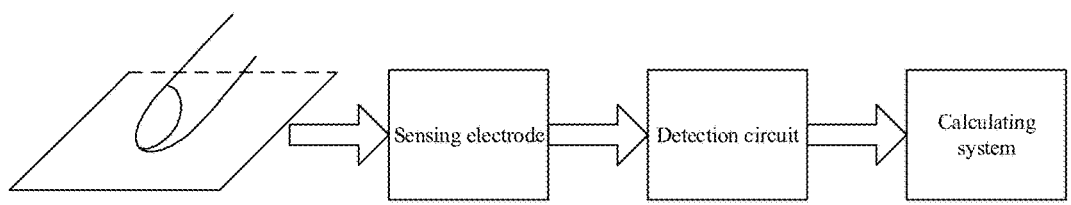
FIG. 1 is a schematic diagram of a force detecting system of an embodiment of the present disclosure.

FIG. 1 is a schematic diagram of a force detecting system of an embodiment of the present disclosure. The force detecting system includes three parts, i.e., a sensing electrode 110, a detection circuit 120 and a calculating system 130. When a force is applied to an input medium (such as a screen of a phone), a deformation signal is generated by the input medium, the sensing electrode converts the deformation signal into a certain form of electrical signal, the detection circuit captures and quantizes the electrical signal, and finally, the quantized signal is input to the calculating system for processing so as to extract the required force information.

Figure 2A:
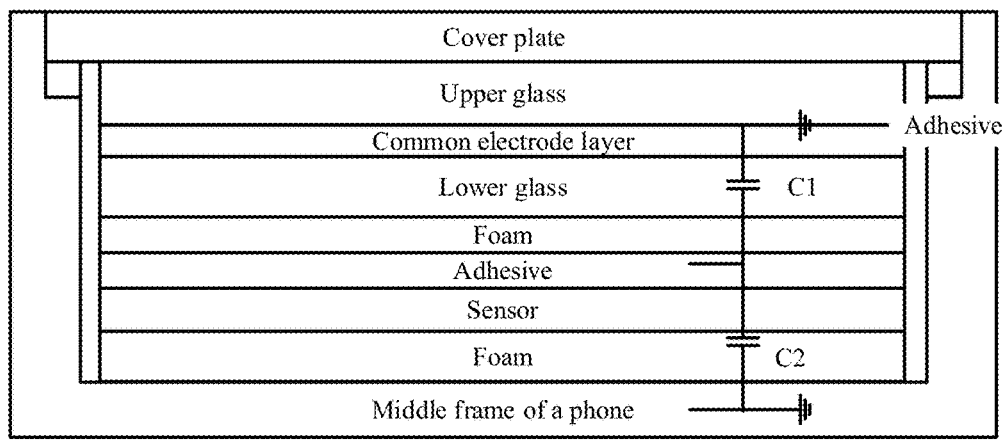
FIG. 2a and FIG. 2b are schematic diagrams of a structure of a sensing electrode of an embodiment of the present disclosure, respectively.
Figure 2B:
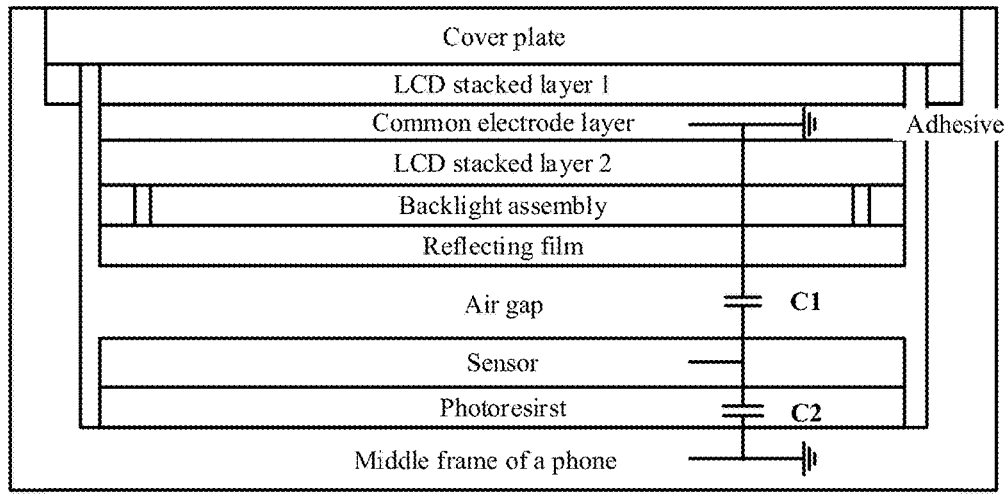

FIG. 2a and FIG. 2b are schematic diagrams of a structure of a sensing electrode 110 of an embodiment of the present disclosure. At present, most of the widely used touch detection technologies adopt a capacitor array. If the sensing electrode of a force detection system also adopts the capacitor array, the existing touch chip can be adopted to detect a force, or integrated to the touch system. In addition, the sensing electrode may be embedded into a liquid crystal display module by adopting the capacitor array without adding too much thickness in structure. Therefore, the sensing electrode in the force detection technology of the embodiment of the present disclosure adopts the capacitive array.

FIG. 2a illustrates a structure of the sensing electrode 110. The sensing electrode is attached under a liquid crystal display ("Liquid Crystal Display", "LCD" for short). There is a certain gap between the sensing electrode and a middle frame supporting an LCD module, and the gap is filled with foam with good compressibility. After the system is powered on to operate, a common electrode (Vcom) layer of the LCD module and the middle frame will be connected to ground of the system, and a capacitance $C_1$ exists between the sensing electrode and the Vcom layer of the LCD module and a capacitance $C_2$ exists between the sensing electrode and the middle frame, and $C_1$ and $C_2$ are connected in parallel. When a force is applied to a cover plate, the cover plate is deformed so that a distance between the sensing electrode and the middle frame is reduced, the capacitance $C_2$ is increased, while the change of $C_1$ at the moment may be substantially negligible, and thus the current force may be determined by detecting the change of $C_2$.

FIG. 2b illustrates a structure of another sensing electrode 110. In the structure, the sensing electrode is attached to a middle frame supporting an LCD module through an optically clear adhesive ("Optically Clear Adhesive", "OCA" for short), and there is a certain gap between the sensing electrode and the LCD module. After the system is powered on to operate, a Vcom layer of the LCD module and the middle frame will be connected to ground of the system, and a capacitance $C_1$ exists between the sensing electrode and the Vcom layer of the LCD module and a capacitance $C_2$ exists between the sensing electrode and the middle frame, and $C_1$ and $C_2$ are connected in parallel. When a force is applied to a cover plate, the cover plate is deformed so that a distance between the Vcom layer of the LCD module and the sensing electrode is reduced, the capacitance $C_1$ is increased, while the change of $C_2$ at the moment may be substantially negligible, and thus the force currently applied to the cover plate may be determined by detecting the change of $C_1$.

Figures 3A, 3B, 3C:
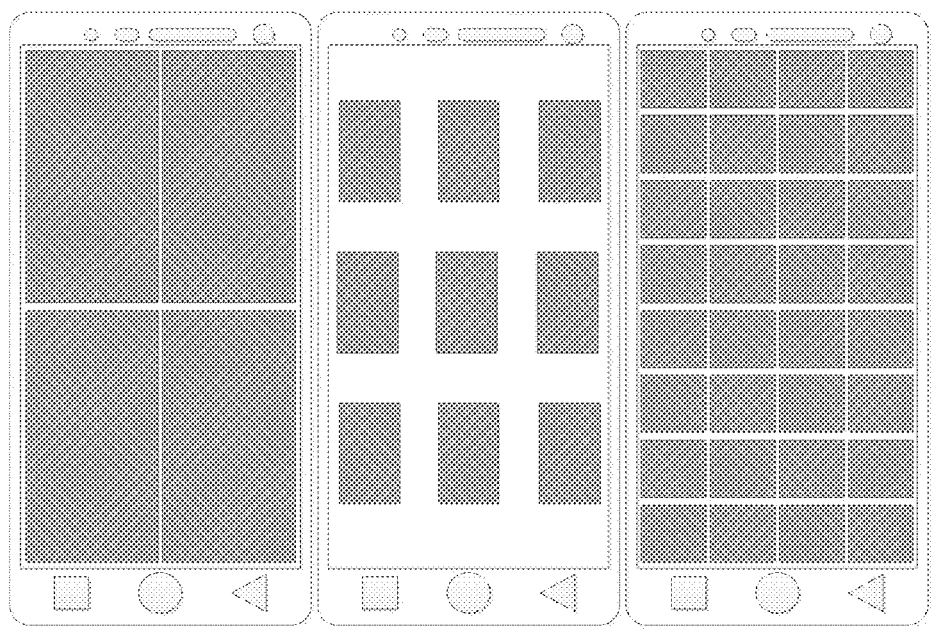
FIG. 3a, FIG. 3b and FIG. 3c are schematic diagrams of a positional structure of the sensing electrode of an embodiment of the present disclosure.

It should be noted that, the structures of the LCD module described above are merely used to describe the structural positions of the sensing electrode. In a specific embodiment, the number of the sensing electrodes and the specific position arrangement may be set according to practical applications, such as three possible layout manners illustrated in FIG. 3a, FIG. 3b and FIG. 3c. Embodiments of the present disclosure are not limited to this.

Figure 4A:
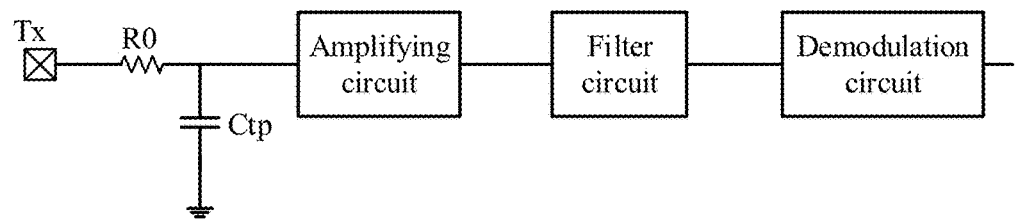
FIG. 4a, FIG. 4b and FIG. 4c are schematic diagrams of a detection circuit of an embodiment of the present disclosure, respectively.
Figure 4B:
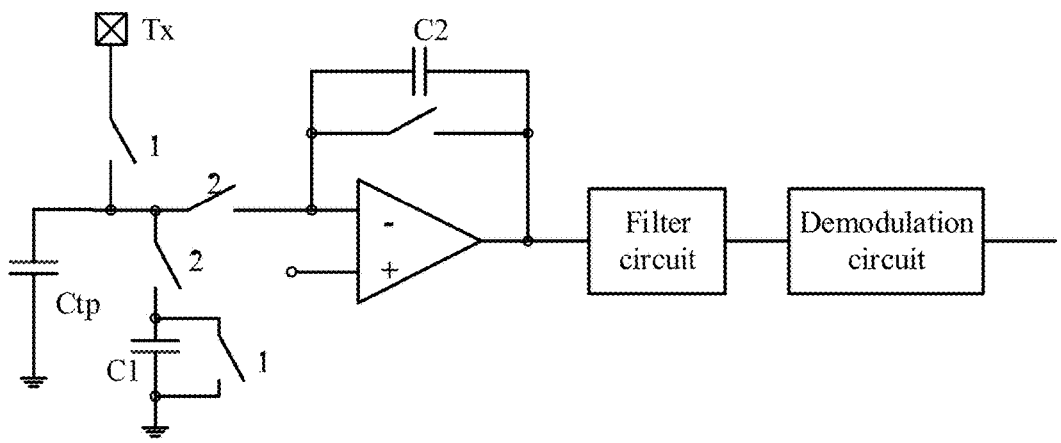
Figure 4C:
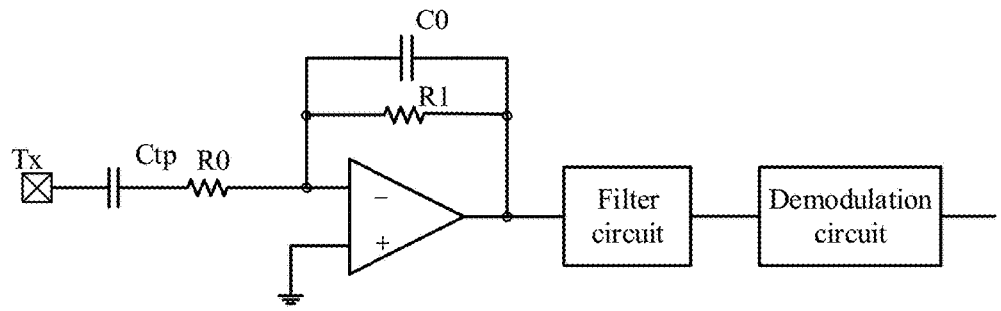

FIG. 4a, FIG. 4b and FIG. 4c illustrate schematic diagrams of the detection circuit 120, respectively. There are multiple types of detection circuits for a capacitor. FIG. 4a and FIG. 4b are self-capacitance detection circuits, and FIG. 4c is a mutual-capacitance detection circuit. And embodiments of the present disclosure are not limited to this.

FIG. 4a is an RC voltage dividing structure. Tx is a driving signal in various forms such as a sine wave or a square wave. The basic detecting principle of the circuit is: the driving signal is coupled to a capacitor Ctp to be detected through a resistor R; the signal on the capacitor Ctp to be detected is amplified and processed by an amplifying circuit; the signal amplified by the amplifying circuit is input to a filter circuit for filter processing; an output signal of the filter circuit is then sent to a demodulation circuit for demodulation to acquire specific form of raw data, i.e., a specific feature (raw data) of an original signal; and finally, the raw data is sent to a subsequent calculating system, so that the calculating system may calculate current force information according to a change of the current raw data.

FIG. 4b adopts a charge transfer method for capacitance detection. Tx is a driving signal in various forms such as a sine wave or a square wave. The basic detecting principle of the circuit is: a control switch $\varphi_1$ is turned off while $\varphi_2$ is turned on, a capacitor Ctp to be detected is charged while the capacitor $C_1$ is discharged; the control switch $\varphi_2$ is turned off while the control switch $\varphi_1$ is turned on, the capacitor C1 is charged by voltage dividing with the capacitor Ctp to be detected, and the C2 is integrally charged; an output signal of an integrating circuit is sent to a filter circuit for filter processing; an output signal of the filter circuit is input to a demodulation circuit for demodulation to acquire specific form of raw data, i.e., a specific feature of an original signal; and finally, after the raw data is input to a subsequent calculating system, the calculating system can calculate current force information according to a change of the current raw data.

FIG. 4c is another capacitance detection method of an embodiment of the present disclosure. Tx is a driving signal in various forms such as a sine wave or a square wave. The basic principle thereof is as follows.

The driving signal is coupled to an integrating amplifier circuit at a rear end through a capacitor Ctp to be detected; an output signal of the integrating amplifier circuit is input to a filter circuit for filter processing; an output signal of the filter circuit is input to a demodulation circuit for demodulation to acquire specific form of raw data, i.e., a specific feature of an raw signal; and finally, after the raw data is sent to a subsequent calculating system, the calculating system can calculate current force information according to a change in the current raw data.

Figure 5:
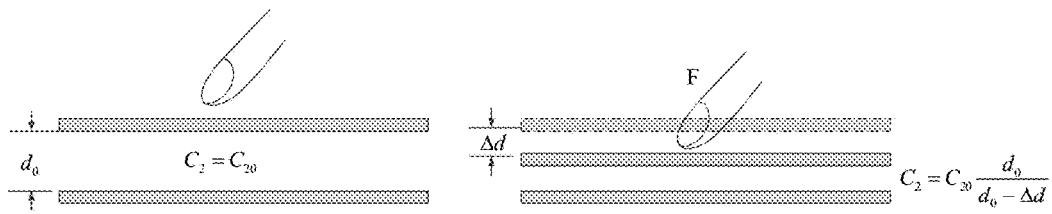
FIG. 5 is a schematic diagram of a force change of an embodiment of the present disclosure.

FIG. 5 illustrates a schematic diagram of a force change of an embodiment of the present disclosure. A force calculating method of the present disclosure will be described below with reference to the sensing electrode shown in FIG. 2a and the detection circuit shown in FIG. 4a, and the present disclosure is not limited to this.

If the capacitance to be detected $Ctp=C_1+C_2$ is achieved, during the force exertion, $C_1$ is considered to be substantially unchanged, $C_2$ increases as the force increases, and $C_2$ may be equivalent to a parallel plate capacitance in a local region subjected to the force.

Assuming that in the detection circuit as shown in FIG. 4a, a driving signal is A sin ($\omega t+\varphi$), an amplifying circuit gain is and a demodulation circuit takes an amplitude demodulation manner, therefore, output raw data is:

$$Rawdata = \frac{AG}{\sqrt{1+[\omega R_0(C_1+C_2)]^2}} \quad (1)$$

$$= \frac{AG}{\sqrt{1+\left[\omega R_0\left(C_1+C_{20}\frac{d_0}{d_0-\Delta d}\right)\right]^2}}$$

In formula (1), $\Delta d$ is a deformation generated by a certain force F. The deformation generated by the force in the embodiment involved in the present disclosure is a slight deformation, and thus F and $\Delta d$ approximately satisfy the Hooke's law, i.e., $F=k\Delta d$, where k is different for different positions. Formula (1) may be written as:

$$Rawdata = \frac{AG}{\sqrt{1+\left[\omega R_0\left(C_1+\frac{C_{20}d_0}{d_0-F/k}\right)\right]^2}} \quad (2)$$

$$= \frac{AG}{\sqrt{1+\left[\omega R_0\left(C_1+\frac{kC_{20}d_0}{kd_0-F}\right)\right]^2}}$$

Where $a=AG$, $b=\omega R_0 C_1$, $c=\omega R_0 C_{20} k d_0$, $d=kd_0$, and formula (2) may be written as:

$$Rawdata = \frac{a}{\sqrt{1+\left(b+\frac{c}{d-F}\right)^2}} \quad (3)$$

Since it is difficult to acquire the values of an amplifying circuit gain G, parallel plate capacitances $C_1$ and $C_{20}$, an initial spacing $d_0$ of the parallel plate capacitance $C_{20}$, and an elastic stiffness coefficient k in advance, a force cannot be directly calculated using formula (3) in the prior art.

Figure 6:
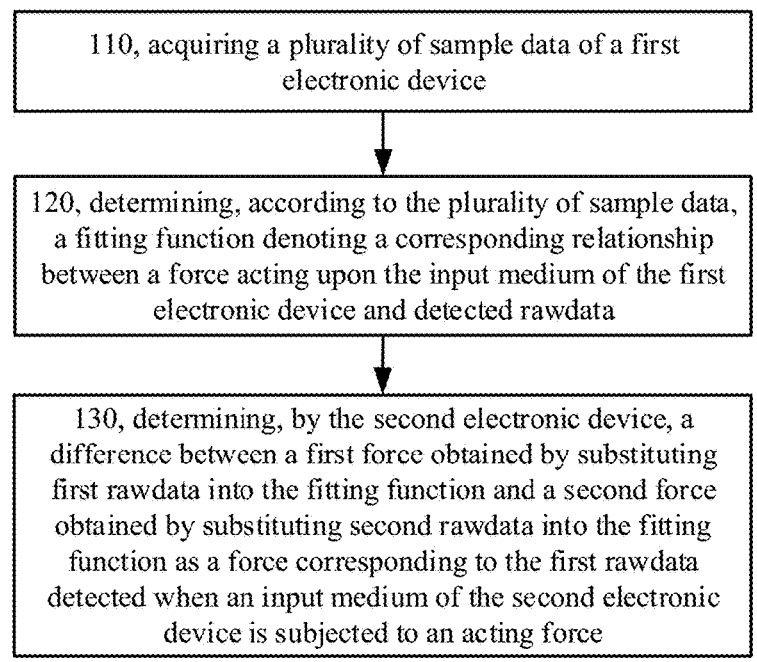
FIG. 6 is a schematic flow diagram of a method for detecting a force of an embodiment of the present disclosure.

FIG. 6 illustrates a schematic flow diagram of a method for detecting a force according to an embodiment of the present disclosure. As shown in FIG. 6, the method includes the followings.

A force detecting system includes a sensing electrode, a detection circuit and a calculating system. When a force is applied to an input medium (such as a screen body of a phone), a deformation signal is generated on the input medium, the sensing electrode converts the deformation signal into a certain form of an electrical signal, the detection circuit captures and quantizes the electrical signal, and finally, the quantized raw data is input to the calculating system for processing so as to extract force information.

110, acquiring a plurality of sample data of a first electronic device, where each of the plurality of sample data includes a preset force and raw data corresponding to the preset force.

For an electronic device (i.e., the first electronic device), n different known forces $F_i$ are acquired in advance, where i=1, 2, . . . n, and a deformation signal is generated by $F_i$ applied to an input medium of the first electronic device, the sensing electrode of the first device converts the deformation signal into an electrical signal, and the detection circuit detects the electrical signal for quantization, i.e., raw data $r_i$ corresponding to $F_i$ is detected, where i=1, 2, . . . n, i.e., n groups of data ($F_i$, $r_i$) are acquired.

It should be understood that, when the sample data is collected as above, $F_i$ may also be any strength within the measurement range, preferably, the number of sample data is greater than the number of unknown parameters in formula (3) (i.e., in the embodiment of the present disclosure, the number of sample data is greater than 4), and the present disclosure is not limited to this.

It should be noted that, an executive body of the method may be an apparatus for detecting a force, and the apparatus for detecting the force may include a manipulator or a robot, a computer platform (such as the installation of relevant application software (app) on an electronic device) and the like. The manipulator or the robot is used for acquiring sample data, and the computer platform is used for curve fitting according to the sample data. That is, the apparatus for detecting the force may be an independent apparatus, or it may also be set in an electronic device or another apparatus, or it may be an improved electronic device having the above functions or the like. For convenience of description, the following embodiment will be illustrated by taking the apparatus for detecting the force being an independent apparatus as an example, and the present disclosure is not limited to this.

120, determining, according to the plurality of sample data, a fitting function denoting a corresponding relationship between a force applied to the input medium of the first electronic device and detected raw data is determined.

Due to the existence of an error in measuring data, in order to reduce the influence of the error, an approximating function may be constructed, so that the characteristic of the approximating function may be reflected from a general trend, i.e., a function ($P_n$ (x) with the lower power) applied to a whole range is sought, but it is not strictly required to pass through all points ($x_i$, $y_i$), but just as near as the points ($x_i$, $y_i$), so that the basic trend of data may be reflected. In general, an deviation of $P_n$ (x) from known functions here may reach the minimum if measured in a certain way, i.e., $P_n$ (x)−$y_i$ is minimal, and this method of seeking for the approximating function is called a curve fitting method.

For instance, for the given n groups of data ($F_i$, $r_i$), where i=1, 2, . . . n, in a function $$R = \frac{a}{\sqrt{1 + \left(b + \frac{c}{d-F}\right)^2}},$$

R(F) is sought, so that the sum of square of an error $P_i$=R($F_i$)−$r_i$ (i=1, 2, . . . n) is minimal, i.e., $$\sum_{i=0}^{n} P_i^2 = \sum_{i=0}^{m} [R(F_i) - r_i]^2 = \min$$

In terms of the geometric sense, it is to seek for a curve r=R($F_i$) having the minimal sum of square of the distance with the given point ($F_i$, $r_i$), where i=1, 2, . . . n, and the function R(Fi) is the fitting function or the least square solution.

It should be understood that, methods of considering the magnitude of deviation mainly are the maximum value of the absolute value of the error, the sum of the absolute value of the error, the arithmetic square root of the sum of square of the error and the like, and the present disclosure is not limited to this.

The curve fitting is performed by adopting the method of the least square solution according to the acquired n groups of data ($F_i$, $r_i$), where i=1, 2, . . . n, so that a fitting function denoting a correspondence between force and raw data may be determined, that is to say, each of unknown parameters a, b, c and d in the above formula (3) may be acquired. Therefore, the magnitude of an acting force applied to the input medium may be determined by raw data detected by the acting force applied to the input medium of the first electronic device according to the fitting function.

Figure 7:
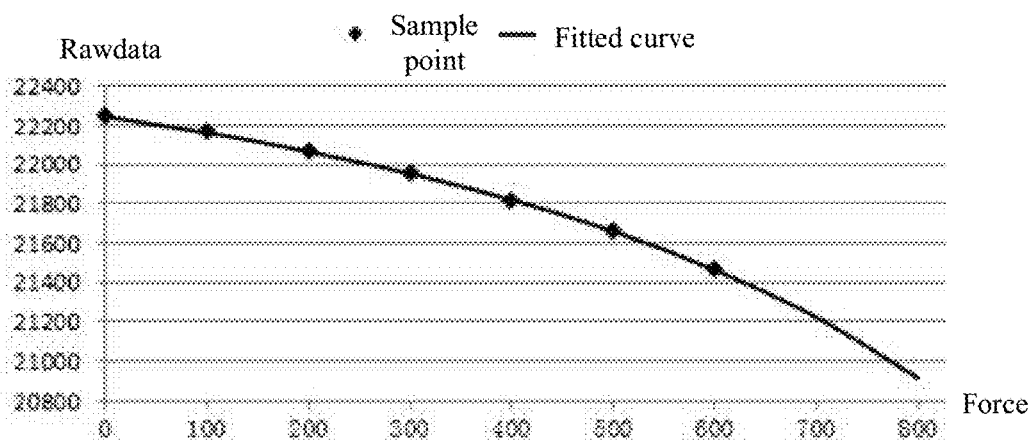
FIG. 7 is a schematic curve diagram of a fitting function of an embodiment of the present disclosure.

For example, sample data with the forces of 0 g, 100 g, 200 g, 300 g, 400 g, 500 g and 600 g, respectively is collected in advance, and Raw data corresponding to each force is recorded, i.e., the apparatus for detecting the force acquires seven groups of data ($F_i$, $r_i$), where i=1, 2, . . . 7. Parameters a, b, c and d in calculating formula (3) are determined by performing a curve fitting on these seven groups of data. It can be seen from FIG. 7 that, all the sample data may well fall on the fitting curve. Therefore, the sensing electrode converts the detected deformation signal into an electrical signal, the detection circuit captures and quantizes the electrical signal to acquire raw data, and finally, the raw data is sent to the calculating system for processing, i.e., the accurate force information may be calculated by substituting the output raw data into formula (3).

130, determining, by the second electronic device, a difference between a first force obtained by substituting first raw data into the fitting function and a second force obtained by substituting second raw data into the fitting function as a force corresponding to the first raw data detected when an input medium of the second electronic device is subjected to an acting force, and the second raw data is obtained by detecting a deformation signal generated by a zero force applied to the input medium of the second electronic device.

Figure 8:
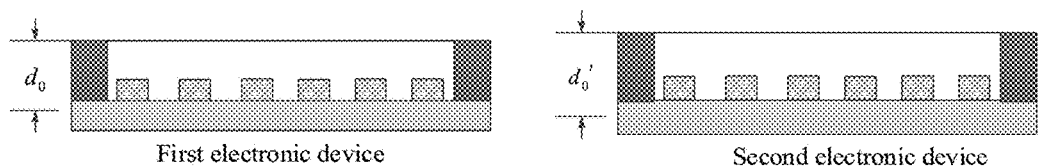
FIG. 8 is a schematic diagram of initial distances of sensing electrodes in different electronic devices of an embodiment of the present disclosure.

In the practical batch production, it is difficult to ensure that an initial distance $d_0$ of a sensing electrode is the same in different electronic devices, for instance, as shown in FIG. 8, there is a difference between initial distances $d_0$ and $d_0$' of a sensing electrode in different electronic devices. Therefore, there is also a difference between curves determined by formula (3) in different electronic devices. If the apparatus for detecting the force applies parameters a, b, c and d calculated by a certain electronic device according to a corresponding relationship between the known force and raw data to all other electronic devices so as to calculate a force, the force calculated by another electronic device may have a greater deviation. If each electronic device adopts the manner of pressing in advance to acquire parameters a, b, c and d, the configuration efficiency will be reduced.

If initial distances of certain sensing electrodes of two electronic devices are $d_1$ and $d_2$, respectively, according to formula (2), it arrives at:

$$Rawdata_1 = f_1(F) \frac{AG}{\sqrt{1 + \left[\omega R_0 \left(C_1 + \frac{C_{20}^1 d_1}{kd_1 - F}\right)\right]^2}} \quad (4)$$

$$Rawdata_2 = f_2(F) \frac{AG}{\sqrt{1 + \left[w R_0 \left(C_1 + \frac{kC_{20}^2 d_2}{kd_2 - F}\right)\right]^2}}$$

$C_{20}^1 d_1 = C_{20}^2 d_2$ in formula (4) is a constant only in association with an area of the sensing electrode.

In summary, $f_2(F) = f_1(F - k(d_2 - d_1))$ \quad (5)

The above formula (5) indicates that, though initial distances of sensing electrodes of different electronic devices are different, function curves thereof still have a certain determination relationship, i.e., $f_2$(F) is obtained by translating $f_1(F)$ to the right by k $(d_2-d_1)$. If $d_2<d_1$, $f_2(F)=f_1(F-k(d_2-d_1))$ indicates that $f_2(F)$ is obtained by translating $f_1(F)$ to the left by k $(d_2-d_1)$.

Figure 9A:
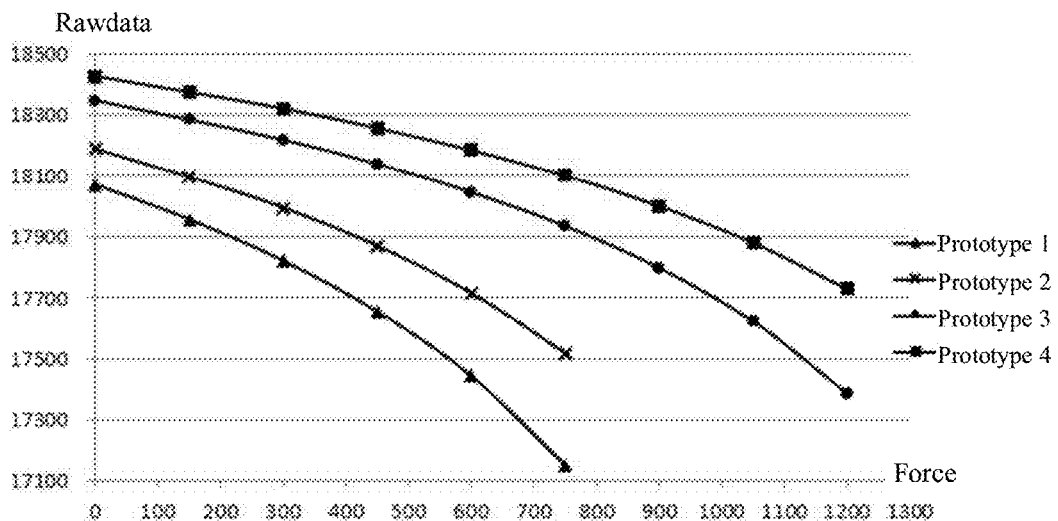
FIG. 9a, FIG. 9b and FIG. 9c are schematic curve diagrams of functions of electronic devices of an embodiment of the present disclosure.
Figure 9B:
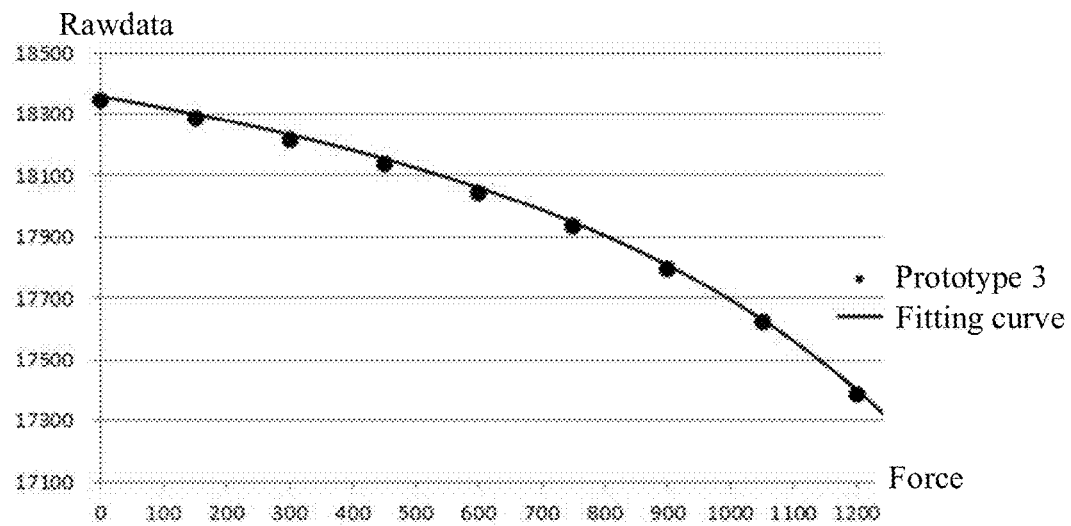
Figure 9C:
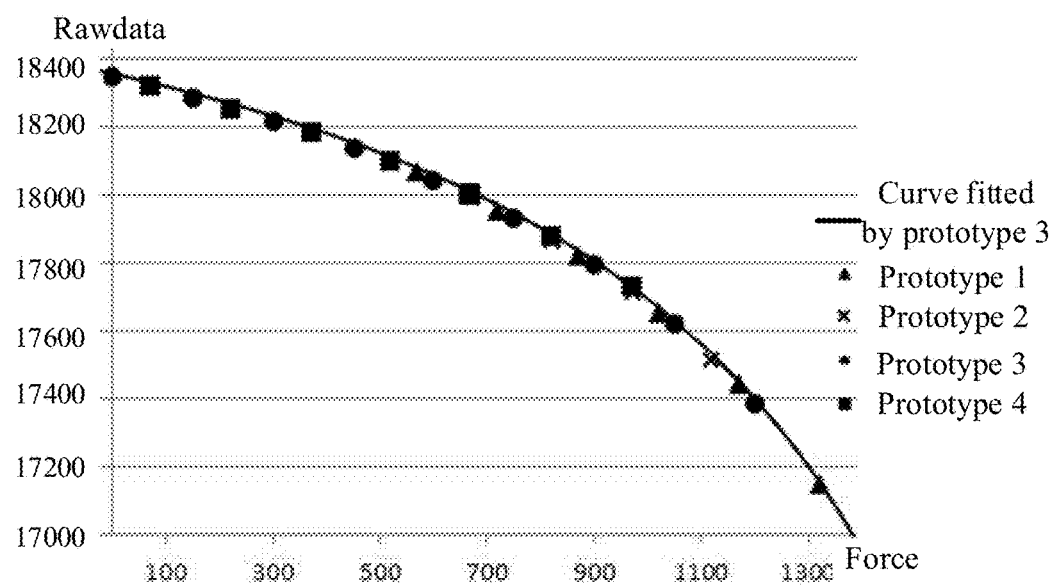

For example, FIG. 9a illustrates function curves fitted by four electronic devices through the above embodiments. It may find that each electronic device has a different function curve. FIG. 9b is a curve corresponding to a fitting function fitted according to formula (3) using sample data of an electronic device 3 in FIG. 9a. FIG. 9c shows a result of translating a function curve of each electronic device in FIG. 9a along a horizontal direction. In the process of translating, by using the electronic device 3 as a baseline, it may be seen that sample data of an electronic device 1, an electronic device 2 and an electronic device 4 may well fall on the fitting curve obtained by the electronic device 3, and locate at different segments on the fitting curve.

Therefore, the magnitude of an acting force applied to the input medium may be determined by raw data detected by the acting force applied to the input medium of the first electronic device according to the fitting function. Similarly, a corresponding relationship between an acting force generated by another batch-produced electronic device acting up on the input medium and detected raw data may also be determined according to the fitting function of the first electronic device (i.e., a prototype). That is to say, in the embodiment of the present disclosure, the second electronic device may be the same as or different from the first electronic device, and the present disclosure is not limited to this.

If the second electronic device is the same as the first electronic device, i.e., when the prototype per se needs to detect a force, the first electronic device may calculate a first force corresponding to the detected first raw data according to the fitting function, detect the first electronic device to obtain second raw data by a zero force, and substitute the second raw data into the fitting function to calculate a second force; since the fitting function is calculated according to the sample data acquired by the first electronic device, the second force is zero. Therefore, the magnitude of the force applied to the input medium of the second electronic device is determined according to a difference (i.e., the first force) between the first force and the second force. That is to say, the force calculated by substituting detected raw data in real-time into the fitting function is the force corresponding to the raw data.

If the second electronic device is different from the first electronic device, after detecting first raw data, the second electronic device may calculate a first force corresponding to the detected first raw data according to the determined fitting function, and then determine second raw data detected when a force is zero, substitute the second raw data into the fitting function to calculate a second force, determine a difference between the first force and the second force as the magnitude of the force applied to the input medium of the second electronic device. In this way, the second electronic device may accurately calculate the magnitude of the force corresponding to detected raw data according to a fitting function fitted by an electronic device without performing a curve fitting separately, a force corresponding to detected raw data may still be accurately calculated, and the efficiency is improved.

It should be understood that, in the embodiment of the present disclosure, the acting force applied to the second electronic device is considered to be zero before the first force is applied to the input medium of the second electronic device, and the present disclosure is not limited to this.

For example, if the curve corresponding to the fitting function of an electronic device 3 is used as a standard curve, and the difference among an electronic device 1, an electronic device 2 and the electronic device 3 only lies in different initial distances of the sensing electrodes, then the curves corresponding to the fitting functions of the electronic device 1 and the electronic device 2, respectively may be translated to different segments of the electronic device 3. Accordingly, as long as a fitting function of an electronic device which is batch-produced is fitted through the least square method, a force corresponding to different raw data respectively may be accurately calculated according to the fitting function. FIG. 10 illustrates that the electronic device 1 and the electronic device 2 calculate a corresponding relationship between a force and detected raw data according to the standard curve of the electronic device 3. The electronic device 2 will be described below as an example. On a curve corresponding to the fitting function of the electronic device 2, raw data (first raw data) corresponding to a force F (i.e., a first force) is $R_1$, however, when the electronic device 2 carries out calculation based on the standard curve, $R_1$ corresponds to $F_2$, in this way, the corresponding relationship between the force of the electronic device 2 and raw data may not be accurately calculated. Therefore, raw data (i.e., second raw data) detected by the electronic device 2 may be determined according to a zero force (i.e., the acting force applied to the electronic device 2 is considered to be zero before $F_1$ presses the input medium of the electronic device 2), and then a force $F_3$ (a second force) corresponding to the second raw data on the standard curve is determined, and a difference between the first force and the second force is determined as a force corresponding to the first raw data detected by the electronic device 2, i.e., $F_2-F_3=F_1$. That is to say, by only acquiring a plurality of sample data of any of batch-produced electronic devices and determining a fitting function of the selected electronic device, another electronic device may also accurately calculate the magnitude of the force corresponding to detected raw data according to the fitting function.

Optionally, the second electronic device determines a force corresponding to first raw data according to a fourth force corresponding to fourth raw data in a data corresponding relationship table and a fifth force corresponding to fifth raw data in the data corresponding relationship table, the data corresponding relationship table includes a corresponding relationship between different raw data and forces determined in advance according to the fitting function, the fourth raw data is greater than the first raw data, and the fifth raw data is smaller than the first raw data.

As it involves a square operation and a root operation in formula (3), there is a relatively large amount of calculation for a microprocessor. Therefore, a calculation may be carried out in advance to establish a table, and force information may be acquired by looking up the table in use.

For example, a table regarding F-R (such as Table 1) is established based on formula (3) with a strength step (step) (such as 50 g) according to the fitting function, and the table is stored in a system flash memory in advance. If first Raw data corresponding to a certain force (for example, a first force) acquired in real-time is y, and $y_i>y\geq y_{i+1}$, $y_i$ is the fourth raw data, and $y_{i+1}$ is the fifth raw data, and a force corresponding to the first Raw data may be calculated by adopting a piecewise linear approximation method, i.e., $$F = F_i + \text{step} * \frac{y_i - y}{y_i - y_{i+1}}.$$

TABLE 1

| | Force (g) | | | | | |
|---|---|---|---|---|---|---|
| | 0 | 50 | 100 | 150 | 200 | 250 ... |
| Raw data | $y_0$ | $y_1$ | $y_2$ | $y_3$ | $y_4$ | $y_5$ |

It should be understood that, if the second electronic device is the same as the first electronic device, a corresponding relationship between the fourth raw data and the force in the data corresponding relationship table, and a corresponding relationship between the fifth raw data and the force in the data corresponding relationship table are calculated directly according to the fitting function; if the second electronic device is different from the first electronic device, a corresponding relationship between the fourth raw data and the force in the data corresponding relationship table is obtained by the above difference calculating method, and will not be repeatedly described herein; similarly, a corresponding relationship between the fifth raw data and the force is calculated, and the present disclosure is not limited to this.

Therefore, in a method for detecting a force provided in an embodiment of the present disclosure, by acquiring a plurality of sample data including a preset force and raw data obtained by detecting the preset force of a first electronic device, and determining, according to the plurality of sample data, a fitting function denoting a corresponding relationship between a force applied to the first device and detected raw data, where the fitting function is used for a second electronic device to determine a force corresponding to raw data detected when it is subjected to an acting force, a plurality of batch-produced electronic devices may accurately calculate a force corresponding to detected raw data according to the fitting function, thus promoting varieties of force information-based applications and improving the user experience.

It should be understood that, in various embodiments of the present disclosure, values of sequence numbers of the above-mentioned various processes do not mean an order of execution which should be determined based upon functionalities and internal logics thereof, rather than setting any limitation to implementation of the embodiment of the present disclosure.

FIG. 11 illustrates a schematic diagram of a method for detecting a force according to another embodiment of the present disclosure. The meanings of various kinds of terms in the embodiment of the present disclosure are the same as those of the foregoing embodiment. It should be noted that, it is just for helping those skilled in the art to better understand the embodiments of the present disclosure, rather than for limiting the scope of the embodiments of the present disclosure.

In the actual batch production, it is difficult to ensure that an initial distance $d_0$ of a sensing electrode is the same in different electronic devices. Therefore, in an embodiment of the present disclosure, by selecting several electronic devices from batch-produced electronic devices, performing a deviation calculation on sample data (F, R) of each of the selected electronic devices to update the sample data, and performing a curve fitting according to the updated sample data of the selected electronic devices to determine a fitting function, a force corresponding to detected raw data is determined according to the fitting function, so that a more accurate fitting function may be obtained without performing a press operation on each of batch-produced electronic devices, the force corresponding to raw data may be more accurately calculated according to the function, an impact of assembly tolerance may be avoided, and configuration efficiency will be improved.

510, acquiring a plurality of sample data of a first electronic device, each of the plurality of sample data comprises a preset force and raw data corresponding to the preset force, for example, $(F_{1m}, R_{1m})$ and $(F_{1(m+1)}, R_{1(m+1)})$, where $F_{1m}$ denotes a preset force applied to the first electronic device, $R_{1m}$ denotes raw data corresponding to the preset force of the first electronic device, and $R_{1m} < R_{1(m+1)}$.

Alternatively, n different known forces $F_i$ of a first electronic device are acquired in advance, where i=1, 2, ... n, and a deformation signal is generated by $F_i$ applied to an input medium of the first electronic device, a sensing electrode of the first device converts the deformation signal into an electrical signal, and a detection circuit quantizes the detected electrical signal for quantization, i.e., raw data $r_i$ corresponding to $F_i$ is detected, where i=1, 2, ... n, i.e., n groups of data $(F_i, r_i)$ are acquired.

It should further be understood that, when the sample data is collected as above, $F_i$ may also be any magnitude within the measurement range, preferably, the number of sample data is greater than the number of unknown parameters in formula (3) (i.e., in the embodiment of the present disclosure, the number of sample data is greater than 4), and the present disclosure is not limited to this.

An executive body of the method may be an apparatus for detecting a force, and the apparatus for detecting the force may include a manipulator or a robot, a computer platform (such as the installation of relevant application software (app) on an electronic device) and the like. The manipulator or the robot is used for acquiring sample data, and the computer platform is used for curve fitting according to the sample data. That is, the apparatus for detecting the force may be an independent apparatus, or it may also be set in an electronic device or another apparatus, or it may be an improved electronic device having the above functions or the like. For convenience of description, the following embodiment will be illustrated by taking the apparatus for detecting the force being an independent apparatus as an example, and the present disclosure is not limited to this.

520, determining, according to the sample data of the first electronic device, a force offset $$\Delta_{2j} = F_{2j} - \left[ F_{1m} + \frac{R_{1m} - R_{2j}}{R_{1m} - R_{1(m+1)}} (F_{1(m+1)} - F_{1m}) \right]$$

of the j-numbered sample data of a third electronic device.

As described above, a plurality of sample data of the third electronic device is acquired, such as $(F_{20}, R_{20})$, $(F_{21}, R_{21})$, ..., $(F_{2j}, R_{2j})$, $(F_{2n}, R_{2n})$, and a preset force satisfies $F_{20} < F_{21} < F_{22} < ... F_{2j} < ... < F_{2n}$. $F_{2j}$ denotes a preset force applied to the third electronic device, and $R_{2j}$ denotes raw data corresponding to the preset force of the third electronic device.

It should be understood that, the third electronic device may be an electronic device selected from batch-produced electronic devices as a prototype. The preset force applied to the first electronic device may be the same as the preset force applied to the third electronic device, i.e., it may be $F_{10} = F_{20}$, and the present disclosure is not limited to this.

530, updating the $(F_{2j}, R_{2j})$ as $(F_{2j} - \Delta_{2j}, R_{2j})$ according to the force offset $$\Delta_{2j} = F_{2j} - \left[F_{1m} + \frac{R_{1m} - R_{2j}}{R_{1m} - R_{1(m+1)}}(F_{1(m+1)} - F_{1m})\right].$$

If the raw data of the j-numbered sample data of the third electronic device is smaller than the raw data of the m-numbered sample data of the first electronic device, and greater than the raw data of the m+1-numbered sample data of the first electronic device (i.e., $R_{1m} > R_{2j} > R_{1(m+1)}$), the sample data $(F_{2j}, R_{2j})$ of the third electronic device is updated as $(F_{2j} - \Delta_{2j}, R_{2j})$.

Due to the existence of an error in the measurement, the force offset may be determined by the method of averaging, for instance, sample data $(F_{20}, R_{20}), (F_{21}, R_{21}), \ldots, (F_{2j}, R_{2j}), \ldots, (F_{2n}, R_{2n})$ is updated to $(F_{20} - \overline{\Delta}_2, R_{20}), (F_{21} - \overline{\Delta}_2, R_{21}), \ldots, (F_{2j} - \overline{\Delta}_2, R_{2j}), \ldots, (F_{2n} - \overline{\Delta}_2, R_{2n})$, where an average force offset of j number of sample data of the second electronic device is $$\overline{\Delta}_2 = \frac{\sum_j \Delta_{2j}}{n+1}.$$

540, determining the fitting function according to the plurality of sample data of the first electronic device and the plurality of updated sample data of the third electronic device.

The third electronic device may be an electronic device selected from batch-produced electronic devices as a prototype. Alternatively, in order to make the fitting function be reflect the feature of the batched-produced electronic devices more accurately, a few more electronic devices may be obtained again as prototypes, and sample data of each of the plurality of prototypes is updated as above to fit a function which may reflect the batch-produced electronic devices more accurately.

Figure 12A:
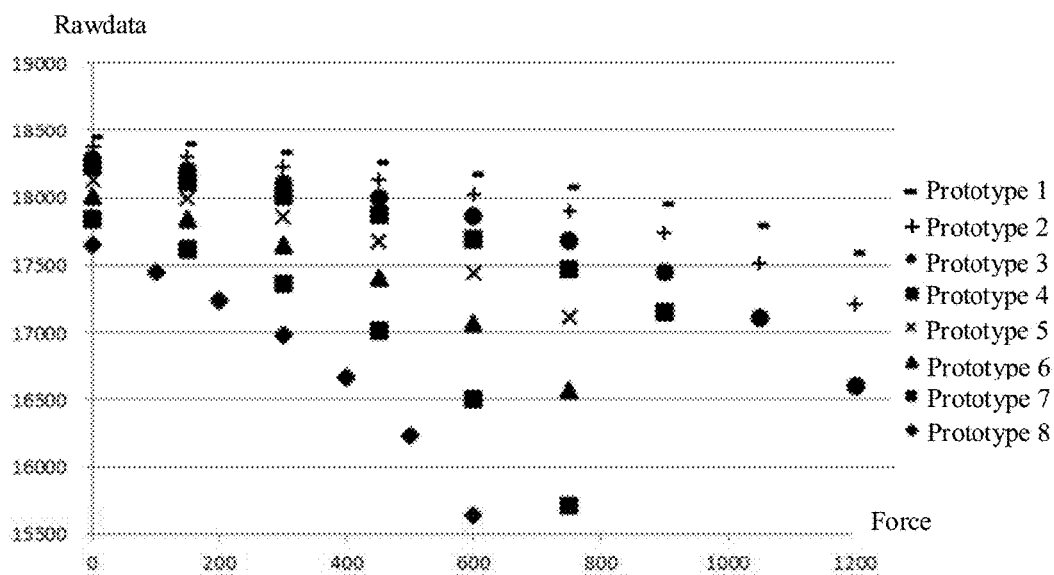
FIG. 12a and FIG. 12b are schematic curve diagrams of sample data according to another embodiment of the present disclosure.

For instance, the specific embodiments are as follows:

(a) N electronic devices with initial distances of sensing electrodes in a descending order are selected and marked as 1, 2, ..., N in sequence; the initial distances of the sensing electrodes of the selected electronic devices include large, medium and small;

(b) each electronic device is pressed with a certain strength step; assuming that sample data of the i-numbered electronic device is $S_i$: $(F_{i0}, R_{i0}), (F_{i1}, R_{i1}), \ldots, (F_{in}, R_{in}))$, and $F_{i0} < F_{i1} < F_{i2} < \ldots < F_{in}$, and sample data of the i-1-numbered electronic device is $S_{i-1}$: $(F_{(i-1)0}, R_{(i-1)0}), (F_{(i-1)1}, R_{(i-1)1}), \ldots, (F_{(i-1)m}, R_{(i-1)m}), (F_{(i-1)(m+1)}, R_{(i-1)(m+1)}), \ldots, (F_{(i-1)n}, R_{(i-1)n})$, and $F_{(i-1)0} < F_{(i-1)1} < F_{(i-1)2} < \ldots F_{(i-1)m} < F_{(i-1)(m+1)} < \ldots F_{(i-1)n}$. For example, FIG. 12a illustrates sample data of different electronic devices;

(c) assuming that raw data $R_{ij}$ of the j-numbered sample $(F_{ij}, R_{ij})$ in $S_i$ is smaller than raw data $R_{(i-1),m}$ of the m-numbered sample and greater than raw data $R_{(i-1)(m+1)}$ of the m+1-numbered sample in $S_{i-1}$, an offset $$\Delta_{2j} = F_{2j} - \left[F_{1m} + \frac{R_{1m} - R_{2j}}{R_{1m} - R_{1(m+1)}}(F_{1(m+1)} - F_{1m})\right]$$

may be calculated according to the j-numbered sample; due to the existence of an error, an average value $$\overline{\Delta}_i = \frac{\sum_j \Delta_{ij}}{n+1}$$

may be taken.

Figure 12B:
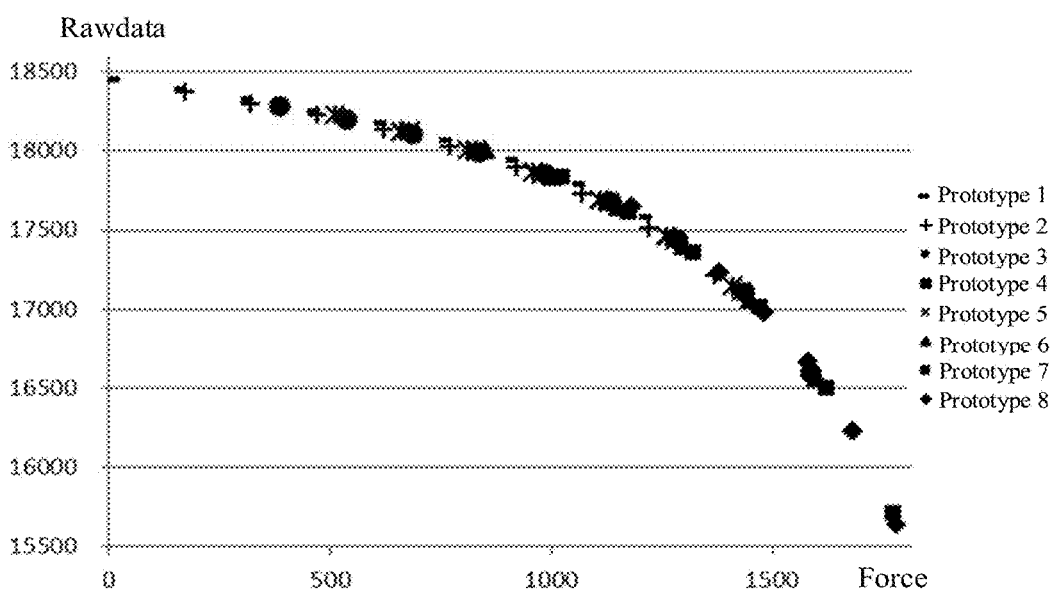

(d) a sample of $S_i$ is updated as $(F_{i0} - \overline{\Delta}_i, R_{i0}), (F_{i1} - \overline{\Delta}_i, R_{i1}), \ldots, (F_{in} - \overline{\Delta}_i, R_{in})$;

(e) i=i+1 is taken, and the step (c) is returned until i=N; and (f) a curve fitting is performed according to formula (3) with new samples $(F_{10}, R_{10}), (F_{11}, R_{11}), \ldots, (F_{1n}, R_{1n}), (F_{20} - \overline{\Delta}_2, R_{20}), (F_{21} - \overline{\Delta}_2, R_{21}), \ldots, (F_{2n} - \overline{\Delta}_2, R_{2n}), (F_{30} - \overline{\Delta}_3, R_{30}), (F_{31} - \overline{\Delta}_3, R_{31}), \ldots, (F_{3n} - \overline{\Delta}_3, R_{3n}), \ldots, (F_{N0} - \overline{\Delta}_N, R_{N0}), F_{N1} - \overline{\Delta}_N, R_{N1}), \ldots, (F_{Nn} - \overline{\Delta}_N, R_{Nn})$ (as shown in FIG. 12b) to determine a fitting function of known parameters a, b, c and d.

530, determining, by the second electronic device, a difference between a first force obtained by substituting first raw data into the fitting function and a second force obtained by substituting second raw data into the fitting function as a force corresponding to the first raw data detected when an input medium of the second electronic device is subjected to the acting force, and the second raw data is obtained by detecting a deformation signal generated by a zero force applied to the input medium of the second electronic device.

540, in the present embodiment may refer to the description of 130 in the embodiment of FIG. 6, which is not repeatedly described herein in order to avoid repetition.

It should be understood that, the second electronic device may be the above first electronic device or the third electronic device as a prototype, and it may also be another electronic device in the batch production.

Optionally, the second electronic device determines a force corresponding to first raw data according to a fourth force corresponding to fourth raw data in a data corresponding relationship table and a fifth force corresponding to fifth raw data in the data corresponding relationship table, the data corresponding relationship table includes a corresponding relationship between different raw data and forces calculated in advance according to the fitting function, the fourth raw data is greater than the first raw data, and the fifth raw data is smaller than the first raw data.

It should be understood that, the above specific embodiment may refer to the previously described embodiments, and will not be repeatedly described herein for brevity.

Therefore, in a method for detecting a force provided in the embodiment of the present disclosure, by performing a force offset calculation on sample data of a plurality of electronic devices to update the sample data, and determining a force corresponding to detected raw data while pressing according to a fitting function determined by the updated sample data, a fitting function with higher accuracy may be fitted by the sample data of the plurality of electronic devices, so that the force corresponding to detected raw data may be accurately calculated, thus promoting varieties of force information-based applications, preferably avoiding an impact of assembly tolerance and improving the user experience.

It should be understood that, in various embodiments of the present disclosure, values of sequence numbers of the above-mentioned various processes do not mean an order of execution which should be determined based upon functionalities and internal logics thereof, rather than setting any limitation to implementation of the embodiment of the present disclosure.

The method for detecting a force according to the embodiments of the present disclosure is described in detail above, and an apparatus for detecting a force according to the embodiments of the present disclosure will be described below.

Figure 13:
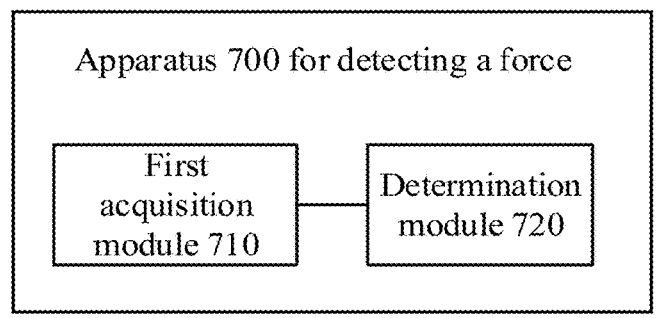
FIG. 13 is a schematic block diagram of an apparatus for detecting a force according to an embodiment of the present disclosure.

FIG. 13 illustrates a schematic block diagram of an apparatus 700 for detecting a force according to an embodiment of the present disclosure. As shown in FIG. 13, the apparatus 700 includes:

a first acquisition module 710, configured to acquire a plurality of sample data of a first electronic device, where each of the plurality of sample data of the first electronic device includes a preset force of the first electronic device and raw data of the first electronic device, and the raw data of the first electronic device is obtained by detecting a deformation signal generated by the preset force of the first electronic device applied to an input medium of the first electronic device; and a fitting module 720, configured to determine a fitting function according to the plurality of sample data of the first electronic device, where the fitting function denotes a corresponding relationship between a force applied to the input medium of the first electronic device and detected raw data, and the fitting function is used for a second electronic device to determine a force corresponding to raw data detected when an input medium of the second electronic device is subjected to an acting force.

Therefore, in the apparatus for detecting a force provided in the embodiment of the present disclosure, by acquiring a plurality of sample data including a preset force and raw data obtained by detecting the preset force of a first electronic device, and determining a fitting function denoting a corresponding relationship between a force applied to the first device and detected raw data according to the plurality of sample data, where the fitting function is used for a second device to determine a force corresponding to raw data detected when it is subjected to an acting force, a function relationship between a force applied to an electronic device and detected raw data may be determined according to a plurality of obtained sample data, thus promoting various applications based on force information- and improving the user experience.

Optionally, in an embodiment of the present disclosure, the apparatus 700 further includes:

a second acquisition module, configured to acquire a plurality of sample data of a third electronic device, where each of the plurality of sample data of the third electronic device includes a preset force of the third electronic device and raw data of the third electronic device, and the raw data of the third electronic device is obtained by detecting a deformation signal generated by the preset force of the third electronic device applied to an input medium of the third electronic device; and an updating module, configured to update the plurality of sample data of the third electronic device according to the plurality of sample data of the first electronic device;

where the fitting module 720 is configured to:

determine the fitting function according to the plurality of sample data of the first electronic device and the plurality of updated sample data of the third electronic device.

In an embodiment of the present disclosure, optionally, the updating module is configured to:

determine a force offset $$\Delta_{2j} = F_{2j} - \left[ F_{1m} + \frac{R_{1m} - R_{2j}}{R_{1m} - R_{1(m+1)}} (F_{1(m+1)} - F_{1m}) \right]$$

of sample data $(F_{2j}, R_{2j})$ of the third electronic device according to $(F_{1m}, R_{1m})$ and $(F_{1(m+1)}, R_{1(m+1)})$, where $F_{1m}$ denotes a preset force applied to the first electronic device, $R_{1m}$ denotes raw data corresponding to the preset force of the first electronic device, and $R_{1m} > R_{1(m+1)}$, $m=0, 1, 2, \ldots N_1-2$, $N_1$ denotes the number of sample data of the first electronic device, and $F_{2j}$ denotes a preset force applied to the third electronic device, $R_{2j}$ denotes raw data corresponding to the preset force of the third electronic device, $j=0, 1, 2, \ldots N_2-1$, $N_2$ denotes the number of the sample data of the third electronic device, and $R_{1m} > R_{2j} > R_{1(m+1)}$; and update the $(F_{2j}, R_{2j})$ as $(F_{2j}-\Delta_{2j}, R_{2j})$ according to the force offset.

Optionally, in an embodiment of the present disclosure, the force corresponding to first raw data detected when the input medium of the second electronic device is subjected to the acting force is determined by a difference between a first force and a second force, where the first force is obtained by substituting the first raw data into the fitting function, the second force is obtained by substituting second raw data into the fitting function, and the second raw data is obtained by detecting a deformation signal generated by a zero force applied to the input medium of the second electronic device.

In an embodiment of the present disclosure, optionally, the force corresponding to the first raw data detected when the input medium of the second electronic device is subjected to the acting force is determined by fourth raw data, a fourth force corresponding to the fourth raw data, fifth raw data and a fifth force corresponding to the fifth raw data, where the fourth raw data is raw data greater than the first raw data in a data corresponding relationship table, and the fifth raw data is raw data smaller than the first raw data in the data corresponding relationship table, and the data corresponding relationship table includes a corresponding relationship between different raw data and forces calculated in advance according to the fitting function.

Optionally, in an embodiment of the present disclosure, the fitting function is:

$$R = \frac{a}{\sqrt{1 + \left(b + \frac{c}{d-F}\right)^2}},$$

where a, b, c and d are known parameters, and $a=AG$, $b=\omega R_0 C_1$, $c=\omega R_0 C_{20} k d_0$ and $d=k d_0$, A denotes an amplitude, G denotes an amplifying circuit gain, $C_1$ and $C_{20}$ denote parallel plate capacitances, $d_0$ denotes an initial spacing of $C_{20}$, k denotes an elastic stiffness coefficient, and $R_0$ denotes a resistance.

The apparatus 700 for detecting a force according to an embodiment of the present disclosure may correspond to an apparatus 700 for detecting a force in a method for detecting a force according to an embodiment of the present disclosure, and the above and another operation and/or function of each module of the apparatus 700 for detecting the force is used to achieve the corresponding flow of the each method previously described, respectively, and will not be repeatedly described herein for brevity.

Therefore, in an apparatus for detecting a force provided in an embodiment of the present disclosure, by performing a force offset calculation on sample data of a plurality of electronic devices to update the sample data, and determining a force corresponding to detected raw data while pressing according to a fitting function determined by the updated sample data, a fitting function with higher accuracy may be fitted by the sample data of the plurality of electronic devices, so that a force corresponding to detected raw data may be accurately calculated, thus promoting varieties of force information-based applications, preferably avoiding an impact of assembly tolerance and improving the user experience.

Figure 14:
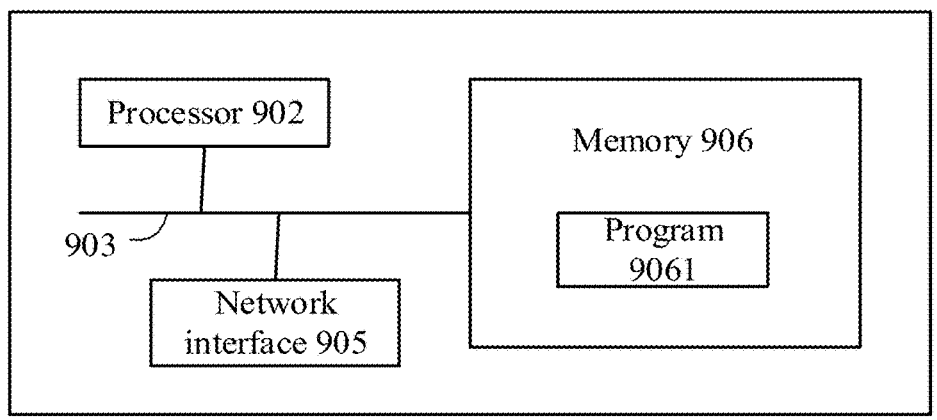
FIG. 14 is a schematic structural diagram of an apparatus for detecting a force according to another embodiment of the present disclosure.

FIG. 14 illustrates an apparatus for detecting a force provided in another embodiment of the present disclosure, including at least one processor 902 (for example, a microprocessor (MCU)), at least one network interface 905 or another communication interface, a memory 906, and at least one communication bus 903, which is used for implementing a connection and communication among these apparatuses. The processor 902 is configured to execute an executable module stored in the memory 906, for example, a computer program. The memory 906 may include a high speed random access memory (RAM: Random Access Memory), also may include a non-volatile memory (non-volatile memory), for example, at least one disk memory. A communication connection with at least one other network element is implemented via at least one network interface 905 (may be wired or wireless).

In some embodiments, the memory 906 stores a program 9061, and the processor 902 executes the program 9061, for executing the following operations:

acquiring a plurality of sample data of a first electronic device through a network interface 905, where each of the plurality of sample data of the first electronic device includes a preset force of the first electronic device and raw data of the first electronic device, and the raw data of the first electronic device is obtained by detecting a deformation signal generated by the preset force of the first electronic device applied to an input medium of the first electronic device; and determining a fitting function according to the plurality of sample data of the first electronic device, where the fitting function denotes a corresponding relationship between a force applied to the input medium of the first electronic device and detected raw data, and the fitting function is used for a second electronic device to determine a force corresponding to raw data detected when an input medium of the second electronic device is subjected to an acting force.

Optionally, the processor 902 is further configured to:

acquire a plurality of sample data of a third electronic device through the network interface 905, where each of the plurality of sample data of the third electronic device includes a preset force of the third electronic device and raw data of the third electronic device, and the raw data of the third electronic device is obtained by detecting a deformation signal generated by the preset force of the third electronic device applied to an input medium of the third electronic device; and update the plurality of sample data of the third electronic device according to the plurality of sample data of the first electronic device;

where the processor 902 is configured to:

determine the fitting function according to the plurality of sample data of the first electronic device and the plurality of updated sample data of the third electronic device.

Optionally, the processor 902 is configured to:

determine a force offset $$\Delta_{2j} = F_{2j} - \left[ F_{1m} + \frac{R_{1m} - R_{2j}}{R_{1m} - R_{1(m+1)}} (F_{1(m+1)} - F_{1m}) \right]$$

of sample data $(F_{2j}, R_{2j})$ of the third electronic device according to $(F_{1m}, R_{1m})$ and $(F_{1(m+1)}, R_{1(m+1)})$, where $F_{1m}$ denotes a preset force applied to the first electronic device, $R_{1m}$ denotes raw data corresponding to the preset force of the first electronic device, and $R_{1m} > R_{1(m+1)}$, m=0, 1, 2, ... $N_1-2$, $N_1$ denotes the number of sample data of the first electronic device, and $F_{2j}$ denotes a preset force applied to the third electronic device, $R_{2j}$ denotes raw data corresponding to the preset force of the third electronic device, j=0, 1, 2, ... $N_2-1$, $N_2$ denotes the number of the sample data of the third electronic device, and $R_{1m} > R_{2j} > R_{1(m+1)}$; and update the $(F_{2j}, R_{2j})$ as $(F_{2j}-\Delta_{2j}, R_{2j})$ according to the force offset.

Optionally, a force corresponding to first raw data detected when the input medium of the second electronic device is subjected to the acting force is determined by a difference between a first force and a second force, where the first force is obtained by substituting the first raw data into the fitting function, the second force is obtained by substituting second raw data into the fitting function, and the second raw data is obtained by detecting a deformation signal generated by a zero force applied to the input medium of the second electronic device.

Optionally, the force corresponding to the first raw data detected when the input medium of the second electronic device is subjected to the acting force is determined by fourth raw data, a fourth force corresponding to the fourth raw data, fifth raw data and a fifth force corresponding to the fifth raw data, where the fourth raw data is raw data greater than the first raw data in a data corresponding relationship table, and the fifth raw data is raw data smaller than the first raw data in the data corresponding relationship table, and the data corresponding relationship table includes a corresponding relationship between different raw data and forces calculated in advance according to the fitting function.

Optionally, the fitting function is:

$$R = \frac{a}{\sqrt{1 + \left(b + \frac{c}{d-F}\right)^2}},$$

where a, b, c and d are known parameters, and a=AG, b=$\omega R_0 C_1$, c=$R_0 C_{20} k d_0$ and d=$k d_0$, A denotes an amplitude, G denotes an amplifying circuit gain, $C_1$ and $C_{20}$ denote parallel plate capacitances, $d_0$ denotes an initial spacing of $C_{20}$, k denotes an elastic stiffness coefficient, and $R_0$ denotes a resistance.

It can be seen from the above technical solution provided in the embodiments of the present disclosure that, by performing a force offset calculation on sample data of a plurality of electronic devices to update the sample data, and determining a force corresponding to detected raw data while pressing according to a fitting function determined by the updated sample data, a fitting function with higher accurate may be fitted by the sample data of the plurality of electronic devices, and a force corresponding to detected raw data may be accurately calculated, thus promoting varieties of force information-based applications, preferably avoiding an impact of assembly tolerance and improving the user experience.

It should be understood that, the term "and/or" herein merely describes association relations between associated objects, and expresses three relations, for example, A and/or B may express three conditions, namely A exists separately, A and B exist simultaneously and B exists separately. In addition, the character "/" in the present disclosure generally represents an "or" relationship of two related objects before and after the character.

It should be understood that, in various embodiments of the present disclosure, values of sequence numbers of the above-mentioned various processes do not mean an order of execution which should be determined based upon functionalities and internal logics thereof, rather than setting any limitation to implementation of the embodiment of the present disclosure.

Those of ordinary skill in the art may be aware that, units and algorithm steps of the examples described in the embodiments disclosed in this paper may be implemented by electronic hardware, computer software, or a combination of the two. Whether these functions are executed in hardware or software mode depends on the specific applications and design constraint conditions of the technical solution. Those skilled may implement the described functions by using different methods for each specific application, but this implementation should not be considered to be beyond the scope of the present disclosure.

Those skilled in the art to which the present disclosure pertains may clearly understand that, for the convenience and simplicity of description, for the specific working processes of the system, the apparatus and the units described above, reference may be made to corresponding processes in the foregoing method embodiments, and it will not be repeatedly described herein.

In the several embodiments provided in the present application, it should be understood that, the disclosed system, apparatus and method may be implemented in other manners. For example, the apparatus embodiments described above are merely exemplary, e.g., the division of the units is merely a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection via some interfaces, apparatuses or units, and may be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the present embodiments according to actual demands.

In addition, the respective functional units in the respective embodiments of the present disclosure may be integrated in one processing unit, or the respective units singly exist physically, or two or more units are integrated in one unit. The above-mentioned integrated unit may be implemented in the form of hardware, or be implemented in a form of a software functional unit.

If the integrated unit is implemented in the form of the software functional unit and is sold or used as an independent product, it may be stored in a computer readable storage medium. Based on such understanding, the technical solution of the present disclosure substantially, or the part of the present disclosure making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present disclosure. The foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

Described above are the specific embodiments of the present disclosure only, but the protection scope of the present disclosure is not limited to this, those skilled who are familiar with the art could readily think of variations or substitutions within the technical scope disclosed by the present disclosure, and these variations or substitutions shall fall within the protection scope of the present disclosure. Therefore, the protection scope of the present disclosure shall be defined by the claims.

What is claimed is:

1. A method for detecting a force, comprising:
   determining, according to a fitting function, a force corresponding to detected raw data when an input medium of a second electronic device is subjected to an acting force; wherein the fitting function is obtained by:
   acquiring a plurality of sample data of a first electronic device, wherein each of the plurality of sample data of the first electronic device comprises a preset force of the first electronic device and raw data of the first electronic device, and the raw data of the first electronic device is obtained by detecting a deformation signal generated by the preset force of the first electronic device applied to an input medium of the first electronic device; and
   determining the fitting function according to the plurality of sample data of the first electronic device, wherein the fitting function denotes a corresponding relationship between a force applied to the input medium of the first electronic device and the detected raw data;
   wherein the force corresponding to the detected raw data when the input medium of the second electronic device is subjected to the acting force is determined by a fourth raw data, a fourth force corresponding to the fourth raw data, a fifth raw data and a fifth force corresponding to the fifth raw data, wherein the fourth raw data is raw data greater than the first raw data in a data corresponding relationship table, and the fifth raw data is raw data smaller than the first raw data in the data corresponding relationship table, and the data corresponding relationship table comprises a corresponding relationship between different raw data and forces calculated in advance according to the fitting function.

2. The method according to claim 1, wherein the determining the fitting function according to the plurality of sample data of the first electronic device, comprises:
   determining the fitting function according to the plurality of sample data of the first electronic device and a plurality of updated sample data of a third electronic device, wherein the plurality of updated sample data of the third electronic device is obtained by:
   acquiring a plurality of sample data of the third electronic device, wherein each of the plurality of sample data of the third electronic device comprises a preset force of the third electronic device and raw data of the third electronic device, and the raw data of the third electronic device is obtained by detecting a deformation signal generated by the preset force of the third electronic device applied to an input medium of the third electronic device; and updating the plurality of sample data of the third electronic device according to the plurality of sample data of the first electronic device.

3. The method according to claim 2, wherein the updating the plurality of sample data of the third electronic device according to the plurality of sample data of the first electronic device, comprises:
determining a force offset $$\Delta_{2j} = F_{2j} - \left[F_{1m} + \frac{R_{1m} - R_{2j}}{R_{1m} - R_{1(m+1)}}(F_{1(m+1)} - F_{1m})\right]$$

of sample data $(F_{2j}, R_{2j})$ of the third electronic device according to $(F_{1m}, R_{1m})$ and $(F_{1(m+1)}, R_{1(m+1)})$, wherein $F_{1m}$ denotes a preset force applied to the first electronic device, $R_{1m}$ denotes raw data corresponding to the preset force of the first electronic device, and $R_{1m} > R_{1(m+1)}$, m=0, 1, 2, ... $N_1$-2, $N_1$ denotes the number of the sample data of the first electronic device, and $F_{2j}$ denotes a preset force applied to the third electronic device, $R_{2j}$ denotes raw data corresponding to the preset force of the third electronic device, j=0, 1, 2, ... $N_2$-1, $N_2$ denotes the number of the sample data of the third electronic device, and $R_{1m} > R_{2j} > R_{1(m+1)}$; and
updating the $(F_{2j}, R_{2j})$ as $(F_{2j}-\Delta_{2j}, R_{2j})$ according to the force offset.

4. The method according to claim 1, wherein the force corresponding to the detected raw data when the input medium of the second electronic device is subjected to the acting force is determined by a difference between a first force and a second force, wherein the first force is obtained by substituting a first raw data into the fitting function, the second force is obtained by substituting a second raw data into the fitting function, and the first raw data is the detected raw data, and the second raw data is obtained by detecting a deformation signal generated by a zero force applied to the input medium of the second electronic device.

5. The method according to claim 1, wherein the fitting function is:

$$R = \frac{a}{\sqrt{1 + \left(b + \frac{c}{d - F}\right)^2}},$$

wherein a, b, c and d are known parameters, and a=AG, b=$\omega R_0 C_1$, c=$\omega R_0 C_{20} k d_0$ and d=$k d_0$, A denotes an amplitude, G denotes an amplifying circuit gain, $C_1$ and $C_{20}$ denote parallel plate capacitances, $d_0$ denotes an initial spacing of $C_{20}$, k denotes an elastic stiffness coefficient, and $R_0$ denotes a resistance.

6. An apparatus for detecting a force, comprising a processer configured to:
acquire a plurality of sample data of a first electronic device, wherein each of the plurality of sample data of the first electronic device comprises a preset force of the first electronic device and raw data of the first electronic device, and the raw data of the first electronic device is obtained by detecting a deformation signal generated by the preset force applied to an input medium of the first electronic device; and
determine a fitting function according to the plurality of sample data of the first electronic device, wherein the fitting function denotes a corresponding relationship between a force applied to the input medium of the first electronic device and detected raw data, and the fitting function is used for a second electronic device to determine a force corresponding to raw data detected when an input medium of the second electronic device is subjected to an acting force;
wherein the force corresponding to the detected raw data when the input medium of the second electronic device is subjected to the acting force is determined by a fourth raw data, a fourth force corresponding to the fourth raw data, a fifth raw data and a fifth force corresponding to the fifth raw data, wherein the fourth raw data is raw data greater than the first raw data in a data corresponding relationship table, and the fifth raw data is raw data smaller than the first raw data in the data corresponding relationship table, and the data corresponding relationship table comprises a corresponding relationship between different raw data and forces calculated in advance according to the fitting function.

7. The apparatus according to claim 6, wherein the processor is configured to:
acquire a plurality of sample data of a third electronic device, wherein each of the plurality of sample data of the third electronic device comprises a preset force of the third electronic device and raw data of the third electronic device, and the raw data of the third electronic device is obtained by detecting a deformation signal generated by the preset force of the third electronic device applied to an input medium of the third electronic device;
update the plurality of sample data of the third electronic device according to the plurality of sample data of the first electronic device; and
determine the fitting function according to the plurality of sample data of the first electronic device and the plurality of updated sample data of the third electronic device.

8. The apparatus according to claim 7, wherein the processor is configured to:
determine a force offset $$\Delta_{2j} = F_{2j} - \left[F_{1m} + \frac{R_{1m} - R_{2j}}{R_{1m} - R_{1(m+1)}}(F_{1(m+1)} - F_{1m})\right]$$

of sample data $(F_{2j}, R_{2j})$ of the third electronic device according to $(F_{1m}, R_{1m})$ and $(F_{1(m+1)}, R_{1(m+1)})$, wherein $F_{1m}$ denotes a preset force applied to the first electronic device, $R_{1m}$ denotes raw data corresponding to the preset force of the first electronic device, and $R_{1m} > R_{1(m+1)}$, m=0, 1, 2, ... $N_1$-2, $N_1$ denotes the number of sample data of the first electronic device, and $F_{2j}$ denotes a preset force applied to the third electronic device, $R_{2j}$ denotes raw data corresponding to the preset force of the third electronic device, j=0, 1, 2, ... $N_2$-1, $N_2$ denotes the number of the sample data of the third electronic device, and $R_{1m} > R_{2j} > R_{1(m+1)}$; and
update the $(F_{2j}, R_{2j})$ as $(F_{2j}-\Delta_{2j}, R_{2j})$ according to the force offset.

9. The apparatus according to claim 6, wherein the force corresponding to the detected raw data when the input medium of the second electronic device is subjected to the acting force is determined by a difference between a first force and a second force, wherein the first force is obtained by substituting a first raw data into the fitting function, the second force is obtained by substituting a second raw data into the fitting function, and the first raw data is the detected raw data and the second raw data is obtained by detecting a deformation signal generated by a zero force applied to the input medium of the second electronic device.

10. The apparatus according to claim 6, wherein the fitting function is:

$$R = \frac{a}{\sqrt{1 + \left(b + \frac{c}{d-F}\right)^2}},$$

wherein a, b, c and d are known parameters, and a=AG, b=$\omega R_0 C_1$, c=$\omega R_0 C_{20} k d_0$ and d=$k d_0$, A denotes an amplitude, G denotes an amplifying circuit gain, $C_1$ and $C_{20}$ denote parallel plate capacitances, $d_0$ denotes an initial spacing of $C_{20}$, k denotes an elastic stiffness coefficient, and $R_0$ denotes a resistance.

\* \* \* \* \*